United States Patent [19]
Welch

[11] Patent Number: 5,577,776
[45] Date of Patent: Nov. 26, 1996

[54] TEE FITTING FOR LINED PIPE

[75] Inventor: Joseph L. Welch, Jenks, Okla.

[73] Assignee: TDW Deleware, Inc., Wilmington, Del.

[21] Appl. No.: 434,180

[22] Filed: May 3, 1995

[51] Int. Cl.$^6$ ............................................. F16L 9/14
[52] U.S. Cl. ........................... 285/55; 285/197; 285/210
[58] Field of Search ........................... 285/55, 156, 197, 285/194, 205, 210, 198, 199

[56] References Cited

U.S. PATENT DOCUMENTS

| | | | |
|---|---|---|---|
| 223,327 | 1/1880 | Farrington | 285/210 |
| 522,005 | 6/1894 | Burke | 285/210 |
| 531,425 | 12/1894 | Porteous | 285/210 |
| 567,115 | 9/1896 | Atkinson et al. | 285/210 |
| 1,574,690 | 2/1926 | Radabaugh | 285/55 X |
| 4,441,744 | 4/1984 | Oostenbrink et al. | 285/197 X |
| 4,922,951 | 5/1990 | Webster | 285/197 X |

FOREIGN PATENT DOCUMENTS

| | | | |
|---|---|---|---|
| 300546 | 9/1917 | Germany | 285/210 |
| 2051991 | 1/1981 | United Kingdom | 285/197 |

*Primary Examiner*—Dave W. Arola
*Attorney, Agent, or Firm*—Head, Johnson & Kachigian

[57] ABSTRACT

A branch connector is provided for coupling a main pipe having a liner disposed therein with a service line and for simultaneously sealing the interface between the edges of the main pipe and the liner. The connector includes an outer hollow housing adapted for coupling to a service saddle, the outer housing having a first aperture for placement adjacent to the outer wall of the main pipe and a second aperture adapted for connection to the service line. An inner sealing assembly is adjustably mountable inside of the housing such that the assembly may be axially extended through the first aperture and into the interior of the main pipe. A lower, outer portion of the sealing assembly bears a seal for secure engagement against the liner and the main pipe, closing the interface therebetween.

10 Claims, 2 Drawing Sheets

TEE FITTING FOR LINED PIPE

BACKGROUND OF THE INVENTION

1. Technical Field

The present invention relates generally to pipe connectors, and, more specifically, to a branch connector for coupling a main pipe having a liner disposed therein with a service line and for simultaneously sealing the interface between the edges of the main pipe and the liner.

2. Background

A significant portion of the pipeline infrastructure in this country and abroad has become in need of reconstruction or rehabilitation. These pipelines distribute natural gas, water, and a variety of other fluids. One recently developed technology used for pipeline rehabilitation is known as CIPP (cured-in-place-pipe). This method of pipeline rehabilitation bonds a plastic lining to the inner wall of an existing pipeline using an adhesive mixture. The plastic lining serves as a primary barrier between the interior of the pipeline and the inner pipeline wall, which may have become subject to leakage due to age or stress. One of the advantages of the CIPP method of rehabilitation is that the complete pipeline length need not be excavated in order to be lined. This "trenchless" technology results in significant cost savings.

Every main pipeline has several smaller branch lines which transmit a fluid, such as gas or water, to end points, such as residences and businesses. Each of these service lines requires that a hole be drilled through the wall of the main pipe and through the liner to provide access to the fluid flow. At the locations where such holes are cut, there exists a mostly circular interface of pipe and liner edges which are exposed to the line pressure of the fluid delivery system. It is desirable to provide a seal at this cut-out interface to prevent the fluid from migrating along potential separations or voids created due to incomplete bonding between the pipe and the liner.

It is an object of this invention to provide a fitting for connecting a lined main pipe with a service line while simultaneously effectively sealing the main pipe and liner interface at the cut-out area.

SUMMARY OF THE INVENTION

According to the present invention, the foregoing and other objects and advantages are attained by a tee fitting having two sections. The first section provides the mechanical strength of the fitting and serves as a protective cover for the second, or sealing, section. Additionally, the first section provides a cavity used to conduct the fluid from the main pipe to the service line. The second section seals the cut-out interface between the edges of the main pipe and the liner.

The first section is an outer hollow housing adapted for coupling to a service saddle, the outer housing having a first aperture for placement adjacent to the outer wall of the main pipe and a second aperture adapted for connection to the service line. The second section, or inner sealing assembly, is adjustably mountable inside of the housing such that the assembly may be axially extended through the first aperture and into the interior of the main pipe. A lower, outer portion of the sealing assembly bears a seal for secure engagement against the liner and the main pipe, closing the cut-off interface.

In accordance with another aspect of the invention, a tee fitting body having three apertures is adapted for coupling to a service saddle. The body has a lower aperture for placement adjacent to the outer wall of the main pipe, a side aperture adapted for connection to the service line, and an upper aperture for access to the interior of the body. An inner sealing assembly further includes an outer, hollow seal base having flexible, segmented legs on a lower portion thereof. A seal is superposed around the legs for closing the cut-out interface between the edges of the main pipe and the liner; and a hollow expander is adjustably mounted inside the seal base such that, upon axial movement toward the main pipe, the expander forces the legs to concentrically expand, securely compressing the seal against the main pipe and the liner. A completion plug closes the upper aperture.

In accordance with further aspects of the invention, the tee fitting body may be threaded for coupling to the service saddle. Likewise, the inner sealing assembly may be threadably mountable inside of the tee fitting body, while the expander can be threadably mounted inside the seal base. Preferably, the inner diameter of the expander is nearly equal to or greater than that of the service line. A cap threadably mountable to the tee fitting body serves to cover the upper aperture after the completion plug is put in place.

The present invention has several advantages over other conventional branch connectors. The use of an external housing (the tee fitting body) to carry the structural loading of the invention is one advantage. Known existing art uses the sealing element as a load carrying member. Another advantage is the use of expanding legs (or fingers) to emplace the sealing element without the need for additional sealing materials. The invention also minimizes flow restriction from the main pipe to the service line by providing a flow area through the invention that is nearly equal to or greater than the service line flow area.

Still other objects and advantages of the present invention will become readily apparent to those skilled in this art from the following detailed description, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature, and not as restrictive.

DETAILED DESCRIPTION OF THE PREFERRED EMBODIMENT

Connectors for coupling main and service lines are variously referred to, among other things, as tapping tees, branch tees, or services tees. The present invention will be referred to generically as a tee fitting. It will be obvious that a large range of tee fittings could be designed which vary to accommodate differing main pipeline and service line sizes and which fall within the scope of the present invention.

The tee fitting of the present invention is composed of two sections. The first section includes structural components of the fitting. This section generally consists of a cast outer body, a completion plug, and an end cap. The first section provides the mechanical strength of the fitting and provides a protective cover for the second, or sealing, section of the fitting. The first section, when assembled, also provides a cavity used to conduct the fluid from the main pipe to the service line.

The second, or sealing, section of the invention provides the means of sealing the circular interface of the liner and the inside wall of the main pipe. This second section generally consists of a seal, a seal base, and an expander.

Figure 1:
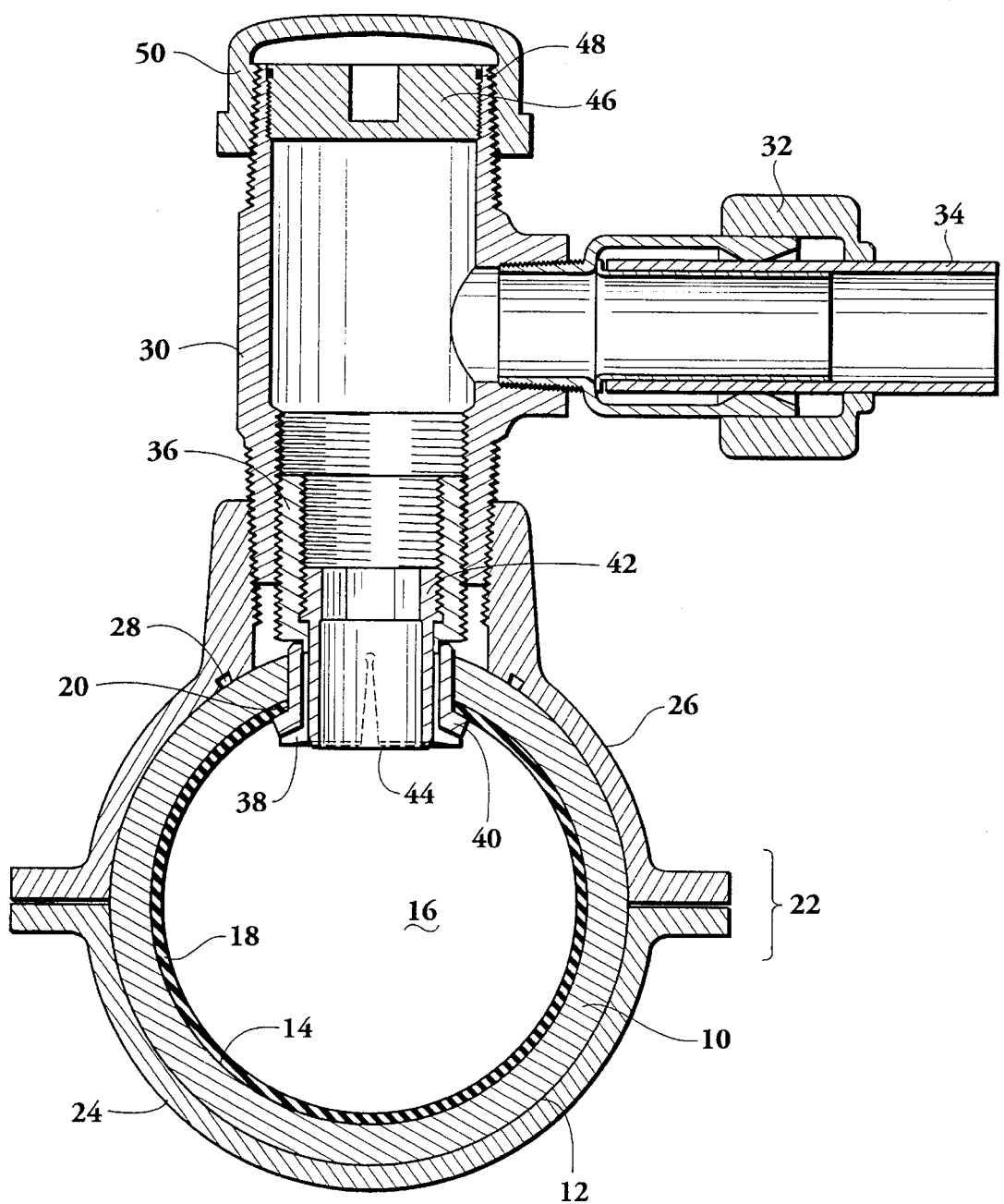
FIG. 1 is a cross section illustration of the preferred embodiment of the invention as installed

FIG. 1 shows a cross sectional view of the preferred embodiment of the invention installed in a pipe and viewed along the axis of the pipe. Generally indicated by the reference numeral 10 is a main pipe. This pipe may be carrying natural gas, water, or any other fluid substance. (Consistent with its general definition, the word fluid when used herein denotes liquid or gaseous substances.) The main pipe 10 has an outer wall 12, an inner wall 14 and a bore or interior 16. The main pipe 10 as illustrated in FIG. 1 has a liner 18 disposed about the circumference of the inner wall 14. As is shown, a hole has been cut through the wall of the main pipe 10 and through the liner 18 to provide access for the present invention. At the location where the hole is cut, there exists mostly circular interface of the edges of the main pipe 10 and the liner 18. This cut-out interface is generally indicated in the drawing by reference numeral 20.

Attached to the outside wall of the main pipe 10 is a service saddle clamp 22. The service saddle 22 is a commercially available item comprising a lower strap 24, an upper base 26, and an upper base sealing element 28, such as an O-ring. The upper base 26 of the service saddle 22 is adapted to threadably receive the present invention in axial alignment over the location where a hole is to be made in the main pipe 10.

The present invention includes an outer hollow housing or tee fitting body 30 adapted for coupling to the upper base 26 of the service saddle 22. The tee fitting body 30 has a first, lower aperture for placement adjacent to the outer wall 12 of the main pipe 10 and a second or side aperture adapted for connection to a service line (said apertures not having reference numerals shown).

Shown coupled to the side aperture of tee fitting body 30 is a mechanical compression fitting 32. Inserted into and held securely by compression fitting 32 is a service line 34. Like the service saddle 22, the compression fitting 32 is a commercial device that is not part of the present invention.

Shown adjustably mounted inside the tee fitting body 30 and seated against the outer wall 12 of the main pipe 10 is a seal base 36. The seal base 36 is hollow and has flexible, segmented members (e.g. legs or fingers) 38 on a lower portion thereof. A seal 40 is superposed around the legs 38 for closing the interface 20 between the edges of the main pipe 10 and the liner 18. A hollow expander 42 is adjustably mounted inside the seal base 36 such that, upon axial movement toward the main pipe 10, the expander 42 forces the legs 38 to concentrically expand, securely compressing the seal 40 against the main pipe 10 and the liner 18. Together the seal base 36, seal 40, and expander 42 comprise what can be called an inner sealing assembly.

Figure 2:
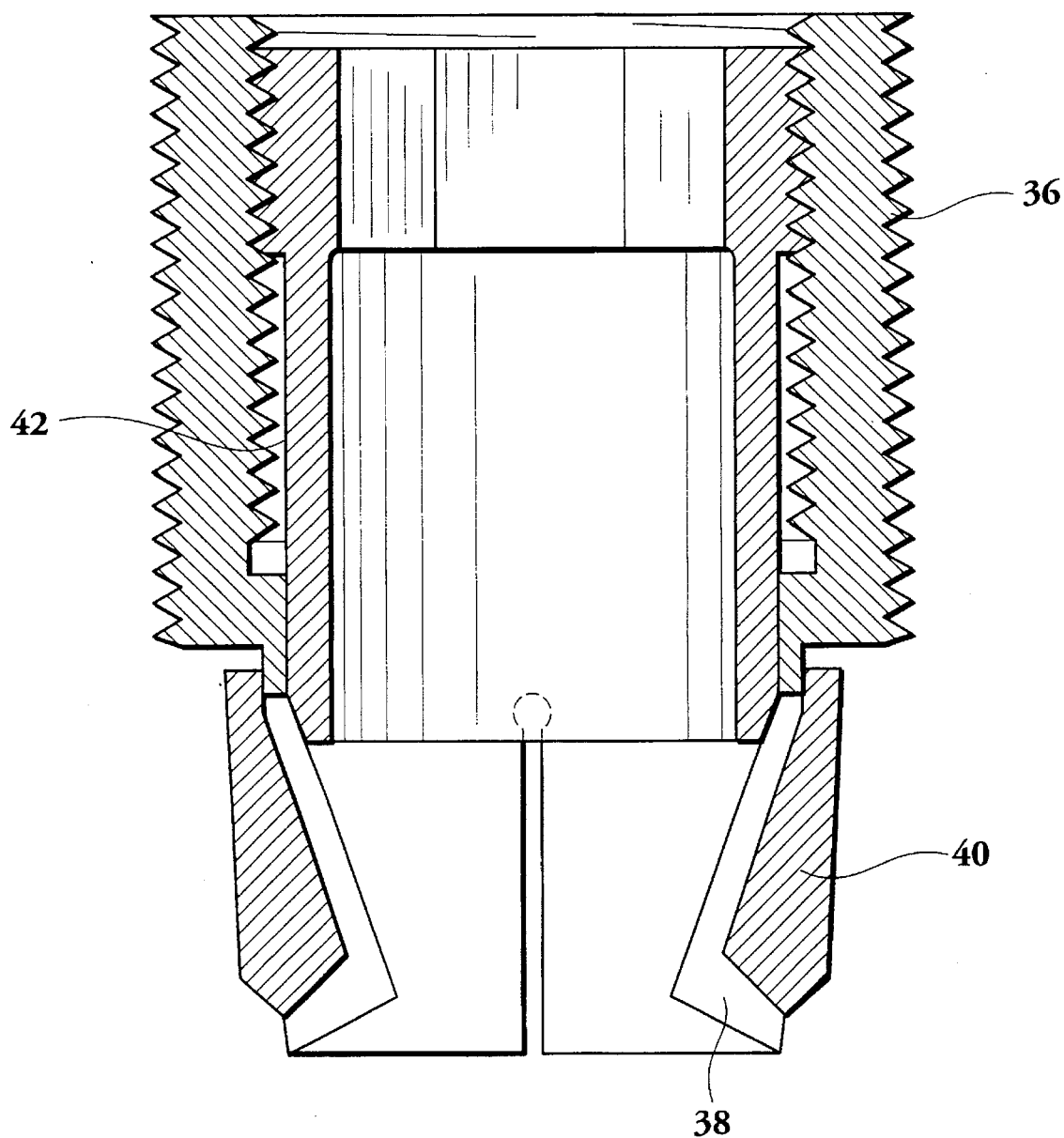
FIG. 2 is a sectional view showing the inner sealing assembly before installation.

FIG. 2 shows the inner sealing assembly in a sectional view prior to installation. It can be seen that the flexible, segmented legs 38 of the seal base 36 are angled inwardly toward the central axis of the seal base 36 prior to installation. This facilitates the entry of the legs 38 and the superposed seal 40 through the lower aperture of the tee fitting body 30 and into the interior 16 of the main pipe 10. After seal base 36 is properly positioned, i.e. after the seal base 36 is seated against the outer wall 12 of the main pipe 10, the expander 42 is moved axially toward the main pipe 10 such that it forces the legs 38 of the seal base 36 to concentrically expand. This expansion securely compresses the seal 40 against the interface 20 of the main pipe 10 and the liner 18.

When installed, the sealing assembly has a terminal orifice, generally indicated in FIG. 1 by the reference numeral 44, for fluid communication with the main pipe 10. The terminal orifice 44 is defined by the inner diameter of the expander 42. Preferably, the inner diameter of the expander 42 is nearly equal to or greater than that of the service line 34. This minimizes flow restriction from the main pipe 10 to the service line 34 by providing a flow area through the invention that is nearly equal to or greater than the service line flow area.

Referring back to FIG. 1, a completion plug 46 is shown seated in an upper aperture of tee fitting body 30. This upper aperture provides access to the interior of the tee fitting body 30. A completion plug sealing element 48, such as an O-ring, is positioned about the circumference of the completion plug 46 for sealing the annulus defined by the inner wall of the tee fitting body 30 and the completion plug 46. An end cap 50 is affixed to the tee fitting body 30 atop the upper aperture and covers the completion plug 46.

The primary components of the invention are preferably adapted for threadable connection to their adjoining pieces. For instance, the tee fitting body 30 may be threaded for coupling to the upper base 26 of the service saddle 22. Likewise, the seal base 36 may be threadably mounted inside of the lower portion of the tee fitting body 30. Similarly, the expander 42 can be threadably mounted inside the seal base 36. Both the completion plug 46 and the end cap 50 may also be threadably coupled to the tee fitting body 30. The side aperture of the tee fitting body 30 may possess threads for receiving the mechanical compression fitting 32 or may otherwise be adapted for connection to the service line 34 or other commercial service line adapters.

Most of the components of the invention, other than the inner sealing assembly and sealing elements, may be cast and machined from metals or alloys. As for the sealing assembly, the seal base 36 and the expander 42 are preferably plastic components, such as polyethylene. The seal 40 is preferred to be a nitrile, although other well known compositions will suffice.

To install the present invention, a suitable location on the main pipe 10 is chosen for the attachment of the service line 34. The service saddle 22 is attached to the main pipe 10 as prescribed by the manufacturer of the particular service saddle 22 to be used. The tee fitting body 30 is then threadably connected to the upper base 26 of the service saddle 22. The mechanical compression fitting 32 is likewise connected to the side aperture of the tee fitting body 30. The completion plug 46 and the end cap 50 are not installed at this time.

Since it is usually preferred to install a branch connector while the main pipeline is pressurized, a manual shut-off valve (not shown) is attached to the tee fitting body 30 using the top outer threads. A combination cutting and installation machine (not shown), an example of which is a TDW T-101a drilling machine, is attached to the shut-off valve. The drilling machine will have a cutting tool, in this case a hole saw, attached before installation onto the shut-off valve. The hole saw will then perform the cutting operation to provide the appropriate size hole required for the particular fitting being installed. The hole saw is then retracted through the shut-off valve. Before removing the drilling machine, the shut-off valve is closed to prevent the open flow of pressurized fluid. The pressure trapped inside the drilling machine is then exhausted and the machine is dismounted from the shut-off valve.

The hole saw is removed from the drilling machine and the inner sealing assembly comprising the seal base 36, seal 40 and expander 42, along with a seal installation tool (not shown) are attached to the drilling machine. The drilling machine is then reattached to the shut-off valve. The shut-off valve is opened and the drilling machine is used to lower the inner sealing assembly into the interior of the tee fitting body 30 until contact is made with the threads at the lower end of the tee fitting body 30. The threads of the lower interior portion of the tee fitting body 30 and those of the outer portion of the seal base 36 will become engaged and installation will continue until the seal base 36 contacts the outer wall 12 of the main pipe 10 and stops turning.

At this point, the seal base 36 is in position and continued operation of the drilling machine will turn the expander 42 and begin the process of concentrically expanding the flexible segmented legs 38 of the seal base 36. The expansion of the lower portion of the seal base 36 will compress the seal 40 against the interface 20 of the main pipe 10 and the liner 18. This expansion provides the required sealing of the interface 20.

The installation is complete when the expander 42 reaches the bottom of the interior threads of the seal base 36. The drilling machine and seal installation tool are retracted, the shut-off valve is closed, and the trapped pressurized fluid is exhausted. The drilling machine is then dismounted from the shut-off valve and the seal installation tool is replaced by a completion installation tool (not shown). An operation similar to the one just described is performed to place the completion plug 46 into position to close the upper aperture of the tee fitting body 30. The final steps are to remove the drilling machine, remove the shut-off valve, and install the end cap 50.

While the invention has been described with a certain degree of particularity, it is manifest that many changes may be made in the method hereinabove described without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for connecting a main pipe with a service line, the main pipe having an outer wall, an inner wall, an interior, and a liner engaging the inner wall creating an interface between the inner wall and the liner, the apparatus serving to simultaneously seal the interface, the apparatus comprising:

(a) an outer hollow housing coupled to a service saddle that is affixed to the main pipe outer wall, the outer housing having a first aperture for placement adjacent to the outer wall of the main pipe and a second aperture adapted for connection to the service line; and (b) an inner sealing assembly adjustably mountable inside of the housing such that the assembly may be axially extended through the first aperture and into the interior of the main pipe, a lower, outer portion of the sealing assembly bearing a seal for secure engagement against the liner and the main pipe, including means for radially expanding the sealing assembly and for forcing the liner into sealing engagement with the inner surface of the main pipe to thereby close the interface, and the inner sealing assembly having a terminal orifice for fluid communication with the main pipe.

2. An apparatus for connecting a main pipe with a service line, the main pipe having an outer wall, an inner wall, an interior, and a liner engaging the inner wall creating an interface between the inner wall and the liner, the apparatus serving to simultaneously seal the interface, the apparatus comprising:

(a) a tee fitting body coupled to a service saddle that is affixed to the main pipe outer wall, the body having a lower aperture for placement adjacent to the outer wall of the main pipe, a side aperture adapted for connection to the service line, and an upper aperture for access to the interior of the body;

(b) an inner sealing assembly adjustably mountable inside of the body such that the assembly may be axially extended through the lower aperture and into the interior of the main pipe, the sealing assembly comprising:
      (i) an outer, hollow seal base having flexible, segmented members on a lower portion thereof;
      (ii) a seal superposed around the members for closing the interface between the main pipe and the liner; and
      (iii) a hollow expander adjustably mounted inside the seal base such that, upon axial movement toward the interior of the main pipe, the expander forces the members to outwardly expand, thereby compressing the seal against the main pipe and the liner to force the liner into sealing engagement with the main pipe interior surface and thereby sealing the interface, the sealing assembly having a terminal orifice for fluid communication with the main pipe defined by the internal diameter of the expander; and (c) a completion plug for closing the upper aperture.

3. The apparatus according to claim 2, wherein an outer, lower portion of the tee fitting body has threads of a pitch complementary to the service saddle for coupling thereto.

4. The apparatus according to claim 2, wherein the inner sealing assembly is threadably mountable inside the tee fitting body.

5. The apparatus according to claim 2, wherein the expander is threadably mounted inside the seal base.

6. The apparatus according to claim 2, wherein the segmented members are of a general L shape.

7. The apparatus according to claim 2, wherein the inner diameter of the expander is at least nearly equal to that of the service line.

8. The apparatus according to claim 2, wherein the side aperture of the tee fitting body is adapted to receive a mechanical compression fitting or other adapter to which is connected the service line.

9. The apparatus according to claim 2, further comprising a cap threadably mountable to the tee fitting body atop the upper aperture.

10. An apparatus for connecting a main pipe with a service line, the main pipe having an outer wall, an inner wall, an interior, and a liner engaging the inner wall creating an interface between the inner wall and the liner, the apparatus serving to simultaneously seal the interface, the apparatus comprising:

(a) a tee fitting body threadably connected to a service saddle that is affixed to the main pipe outer wall, the body having a lower aperture for placement adjacent to the outer wall of the main pipe, a side aperture adapted for connection to the service line, and an upper aperture for access to the interior of the body;

(b) an inner sealing assembly threadably mountable inside of the body such that the assembly may be axially extended through the lower aperture and into the interior of the main pipe, the sealing assembly comprising:
  (i) an outer, hollow seal base having flexible, segmented L-shaped legs on a lower portion thereof;
  (ii) a seal superposed around the legs for closing the interface between the main pipe and the liner; and
  (iii) a hollow expander having an inner diameter at least nearly equal to that of the service line threadably mounted inside the seal base such that, upon axial movement toward the interior of the main pipe, the expander forces the legs to outwardly expand, thereby compressing the seal against the main pipe and the liner to force the liner into sealing engagement with the main pipe interior surface and thereby sealing the interface, the sealing assembly having a terminal orifice for fluid communication with the main pipe defined by the inner diameter of the expander;

(c) a completion plug for closing the upper aperture, a completion plug sealing element being positioned about the circumference of the completion plug; and (d) a cap threadably mountable to the tee fitting body atop the upper aperture.

* * * * *